United States Patent
Mizokami

(10) Patent No.: US 10,193,470 B2
(45) Date of Patent: Jan. 29, 2019

(54) STEP UP/DOWN INVERTER CIRCUIT AND METHOD FOR CONTROLLING SAME

(71) Applicant: OMRON Corporation, Kyoto (JP)

(72) Inventor: Takao Mizokami, Ritto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/736,780

(22) PCT Filed: Feb. 24, 2016

(86) PCT No.: PCT/JP2016/055446
§ 371 (c)(1),
(2) Date: Dec. 15, 2017

(87) PCT Pub. No.: WO2017/038117
PCT Pub. Date: Mar. 9, 2017

(65) Prior Publication Data
US 2018/0175743 A1    Jun. 21, 2018

(30) Foreign Application Priority Data
Sep. 2, 2015 (JP) .................................. 2015-173067

(51) Int. Cl.
*H02M 7/5387* (2007.01)
*H02M 7/538* (2007.01)
(Continued)

(52) U.S. Cl.
CPC ....... *H02M 7/53803* (2013.01); *H02M 7/537* (2013.01); *H02M 7/53871* (2013.01); *H02M 3/1582* (2013.01); *H02M 2001/0064* (2013.01)

(58) Field of Classification Search
CPC ............... H02M 7/48; H02M 7/53871; H02M 7/53803; H02M 3/1582; H02M 2001/0064
See application file for complete search history.

(56) References Cited

U.S. PATENT DOCUMENTS 7,057,905 B2 * 6/2006 Macmillan ............ H02M 3/158
363/17
2005/0030768 A1    2/2005 MacMillan
(Continued)

FOREIGN PATENT DOCUMENTS

JP    2011-259621    12/2011
JP    2012010428    1/2012
(Continued)

OTHER PUBLICATIONS

D. Meneses, F. Blaabjerg, Ó. Garcia and J. A. Cobos, "Review and Comparison of Step-Up Transformerless Topologies for Photovoltaic AC-Module Application," in IEEE Transactions on Power Electronics, vol. 28, No. 6, pp. 2649-2663, Jun. 2013.*
(Continued)

*Primary Examiner* — Jue Zhang
*Assistant Examiner* — Jye-June Lee
(74) *Attorney, Agent, or Firm* — JCIPRNET

(57) ABSTRACT

A step up/down inverter circuit (10) is provided with: a plus line (13p) and a minus line (13m) connected to the plus terminal and minus terminal of a DC power supply, respectively; a voltage dividing circuit (14), a first leg (15), and a second leg (16) which are disposed between the plus line (13p) and the minus line (13m); a first reactor L1, having one end connected to a first intra-leg wiring connecting the switching elements SW1, 2 of the first leg (15); a second reactor L2, having one end connected to second intra-leg wiring connecting the switching elements SW3, 4 of the second leg (16) and having the other end connected to the other end of the first reactor (L1); a bidirectional switching element SW5 disposed between the first intra-leg wiring and a w-terminal (12w); another bidirectional switching element SW6 disposed between the second intra-leg wiring and a u-terminal (12u); and a smoothing circuit (17) for smoothing
(Continued)

the voltages output from the bidirectional switching elements SW5, 6.

11 Claims, 6 Drawing Sheets

(51) Int. Cl.
    *H02M 7/537*     (2006.01)
    *H02M 3/158*     (2006.01)
    *H02M 1/00*     (2006.01)

(56) References Cited

U.S. PATENT DOCUMENTS

2015/0194909 A1* 7/2015 Pahlevaninezhad ......................... H02M 7/5387
    363/132
2018/0115256 A1* 4/2018 Ho ......................... H02M 7/797

FOREIGN PATENT DOCUMENTS

JP     2014-110729     6/2014
JP     2014-241660     12/2014

OTHER PUBLICATIONS

S. Yatsuki, K. Wada, T. Shimizu, H. Takagi and M. Ito, "A novel AC photovoltaic module system based on the impedance-admittance conversion theory," 2001 IEEE 32nd Annual Power Electronics Specialists Conference (IEEE Cat. No. 01CH37230), Vancouver, BC, 2001, pp. 2191-2196 vol. 4.*

"International Search Report (Form PCT/ISA/210) of PCT/JP2016/055446", dated May 17, 2016, with English translation thereof, pp. 1-3.

"Written Opinion (Form PCT/ISA/237)", dated May 17, 2016, with English translation thereof, pp. 1-8.

"Office Action of Japan Counterpart Application," with machine English translation thereof, dated Aug. 21, 2018, p. 1-p. 9.

* cited by examiner

STEP UP/DOWN INVERTER CIRCUIT AND METHOD FOR CONTROLLING SAME

CROSS-REFERENCE TO RELATED APPLICATION

This application is a 371 of international application of PCT application serial no. PCT/JP2016/055446, filed on Feb. 24, 2016, which claims the priority benefit of Japan application no. 2015-173067, filed on Sep. 2, 2015. The entirety of each of the abovementioned patent applications is hereby incorporated by reference herein and made a part of this specification.

TECHNICAL FIELD

The present invention relates to a step up/down inverter circuit and a method for controlling the step up/down inverter circuit.

BACKGROUND ART

FIG. 1 shows a configuration of a conventional inverter circuit (power supply circuit) capable of converting DC power into AC power by a step up/down operation.

As shown in the drawing, this inverter circuit is a combination of a step up/down chopper 100 and a single-phase inverter 110. The step up/down chopper 100 is a circuit which converts a DC voltage Edc into a voltage (hereinafter, referred to as Vdc) higher than a peak value of an AC voltage eac to be outputted and includes a DC reactor 101, switching elements 102 and 103, and smoothing capacitors 104 and 105. The single-phase inverter 110 is a circuit which converts a voltage Vdc into an AC voltage eac and includes switching elements 111 to 114, smoothing capacitors 105 and 117, and AC reactors 115 and 116.

According to the inverter circuit, DC power can be converted into AC power by a step up/down operation. Here, in order to constitute the inverter circuit, two circuits including the step up/down chopper 100 and the single-phase inverter 110 are necessary. Further, since the step up/down chopper 100 includes the DC reactor 101 which has a large volume and weight, and a high cost, the inverter circuit with the above-described configuration is consequently large and heavy.

For that reason, an inverter circuit (a power supply circuit: Patent Literature 1) which converts DC power into AC power with only a step up/down inverter without a DC reactor has been proposed. Here, the inverter circuit disclosed in Patent Literature 1 is configured to constitute a step down converter by switching a switch when an input DC voltage is larger than a peak value of an output AC voltage and to constitute a step up converter by switching the switch when the input DC voltage is smaller than the peak value of the output AC voltage. That is, a switching pattern and a control method need to be switched in accordance with input/output voltage conditions in the inverter circuit disclosed in Patent Literature 1. For that reason, a problem arises in that an AC waveform may be distorted around a switching voltage in the inverter circuit disclosed in Patent Literature 1.

CITATION LIST

Patent Literature

[Patent Literature 1] Japanese Patent Application Laid-Open No. 2011-259621.

SUMMARY OF INVENTION

Technical Problem

An object of the present invention is to provide a step up/down inverter circuit which can convert DC power into AC power without changing step up/down control and can be manufactured with a small size and a low weight at low cost and a control method for controlling the step up/down inverter circuit.

Solution to Problem

In order to solve the above-described problems, according to the invention, there is provided a step up/down inverter circuit that converts DC power with a first voltage from a DC power supply into AC power of a second voltage, the step up/down inverter circuit including: plus and minus lines which are respectively connected to plus and minus output terminals of the DC power supply; a first leg which is disposed between the plus line and the minus line and has two switching elements connected in series; a second leg is disposed between the plus line and the minus line and has two switching elements connected in series; a first reactor having one end connected to a first intra-leg wiring connecting the two switching elements of the first leg; a second reactor having one end connected to a second intra-leg wiring connecting the two switching elements of the second leg and having the other end connected to the other end of the first reactor; a first bidirectional switching element having one end connected to the first intra-leg wiring and having the other end connected to a first output terminal by a first output line; a second bidirectional switching element having one end connected to the second intra-leg wiring and having the other end connected to a second output terminal by a second output line; and a smoothing circuit which is disposed between the first output line and the second output line and smoothes a voltage between the other end of the first bidirectional switching element and the other end of the second bidirectional switching element.

That is, the step up/down inverter circuit of the invention can convert DC power into AC power by a step up/down operation only according to an ON/OFF control of each switching element. Thus, according to the step up/down inverter circuit of the invention, DC power can be converted into AC power by a step up/down operation while preventing a problem in which an AC waveform is distorted around a specific input voltage. Further, the step up/down inverter circuit of the invention does not include a step up/down circuit (performing a step up/down operation with an inverter). Thus, the step up/down inverter circuit of the invention can be manufactured with a small size and a light weight at a low cost compared to a conventional inverter circuit to a degree in which the step up/down circuit is not provided.

At the time of realizing the step up/down inverter circuit of the invention, a voltage dividing circuit which is disposed between the plus line and the minus line and has an intermediate potential portion having a potential corresponding to an intermediate potential between a potential of the plus line and a potential of the minus line and connected to a connection end between the first and second reactors may be further provided. In addition, as the voltage dividing circuit of the step up/down inverter circuit of the invention, a circuit in which two capacitors having the same capacitance are connected in series and a wiring connecting the two capacitors serves as the intermediate potential portion may be employed.

Further, as the smoothing circuit of the step up/down inverter circuit of the invention, a circuit in which two capacitors having the same capacity are connected in series and a wiring connecting the two capacitors is connected to a neutral point, that is, a circuit in which the wiring serves as a neutral line terminal of a single-phase three-line output terminal may be employed.

Further, the step up/down inverter circuit of the invention may be realized as a circuit in which the first reactor and the second reactor are configured so that when a current flows toward a connection end side between the first and second reactors in one of the first and second reactors and a current from the connection end side flows to the other of the first and second reactors, a magnetic field generated by each other is strengthened. With such a configuration, it is possible to realize a step up/down inverter circuit having the same performance by using a first reactor and a second reactor having a small capacity.

Further, a control method for the step up/down inverter circuit of the invention is a method for controlling the step up/down inverter circuit, wherein an AC voltage for a half period in which a potential of the second output terminal is higher than a potential of the first output terminal is output from the first output terminal and the second output terminal by repeatedly performing a first control process while changing a duration of a first state in response to an AC frequency to be output and a step up/down ratio corresponding to a ratio of the first voltage to the second voltage, the first control process being performed such that the first state is formed in which a first switching element corresponding to a switching element near the plus line inside the first leg and a fourth switching element corresponding to a switching element near the minus line inside the second leg are turned on and a second switching element corresponding to a switching element near the minus line inside the first leg, a third switching element corresponding to a switching element near the plus line inside the second leg, the first bidirectional switching element, and the second bidirectional switching element are turned off and then a second state is formed in which the first switching element, the second switching element, the third switching element, and the fourth switching element are turned off and the first bidirectional switching element and the second bidirectional switching element are turned on. Further, in the control method for the step up/down inverter circuit of the invention, an AC voltage for a half period in which the potential of the second output terminal is lower than the potential of the first output terminal is output from the first output terminal and the second output terminal by repeatedly performing a second control process while changing a duration of a third state in response to the AC frequency to be output and the step up/down ratio, the second control process being performed such that the third state is formed in which the second switching element and the third switching element are turned on and the first switching element, the fourth switching element, the first bidirectional switching element, and the second bidirectional switching element are turned off and then a fourth state is formed in which the first switching element, the second switching element, the third switching element, and the fourth switching element are turned off and the first bidirectional switching element and the second bidirectional switching element are turned on.

According to this control method, it is possible to convert DC power into AC power with an arbitrary step up/down ratio range determined from specifications of components in the step up/down inverter circuit of the invention.

Advantageous Effects of Invention

According to the invention, it is possible to provide a step up/down inverter circuit which can convert DC power into AC power without changing a step up/down control and can be manufactured with a small size and a light weight at a low cost. Further, it is possible to convert DC power into AC power with an arbitrary step up/down ratio within a step up/down ratio range determined from specifications of components in such a step up/down inverter circuit.

DESCRIPTION OF EMBODIMENTS

Hereinafter, an embodiment of the present invention is described with reference to the drawings.

First, a configuration and a use pattern of a step up/down inverter circuit 10 according to an embodiment of the invention will be described with reference to FIGS. 2 and 3. In addition, FIG. 2 is an explanatory diagram of a configuration and a use pattern of the step up/down inverter circuit 10 according to the embodiment and FIG. 3 is an explanatory diagram of a more detailed circuit configuration example of the step up/down inverter circuit 10.

Figure 1:
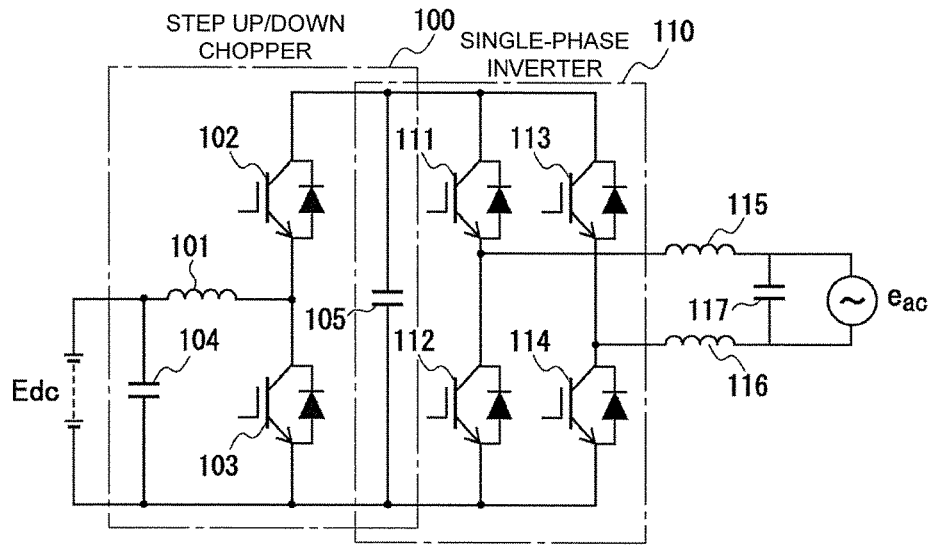
FIG. 1 is a configuration diagram of a conventional inverter circuit.
Figure 2:
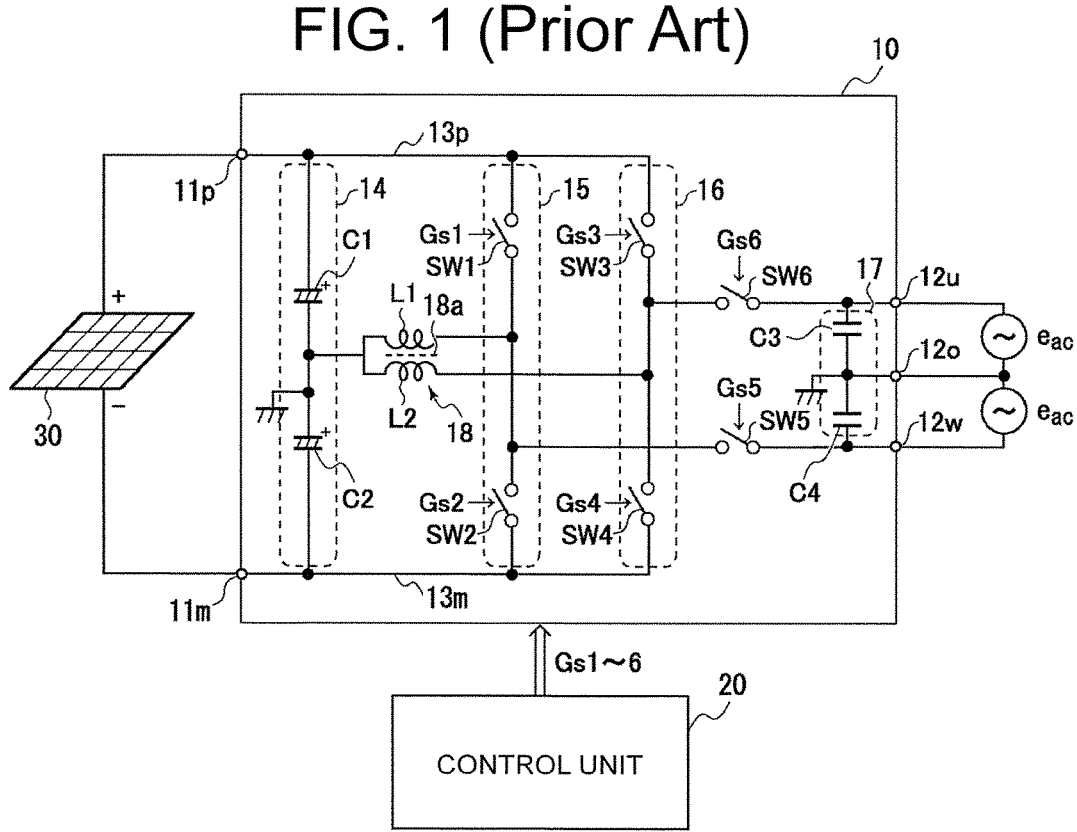
FIG. 2 is an explanatory diagram of a configuration and a use pattern of a step up/down inverter circuit according to an embodiment of the invention.
Figure 3:
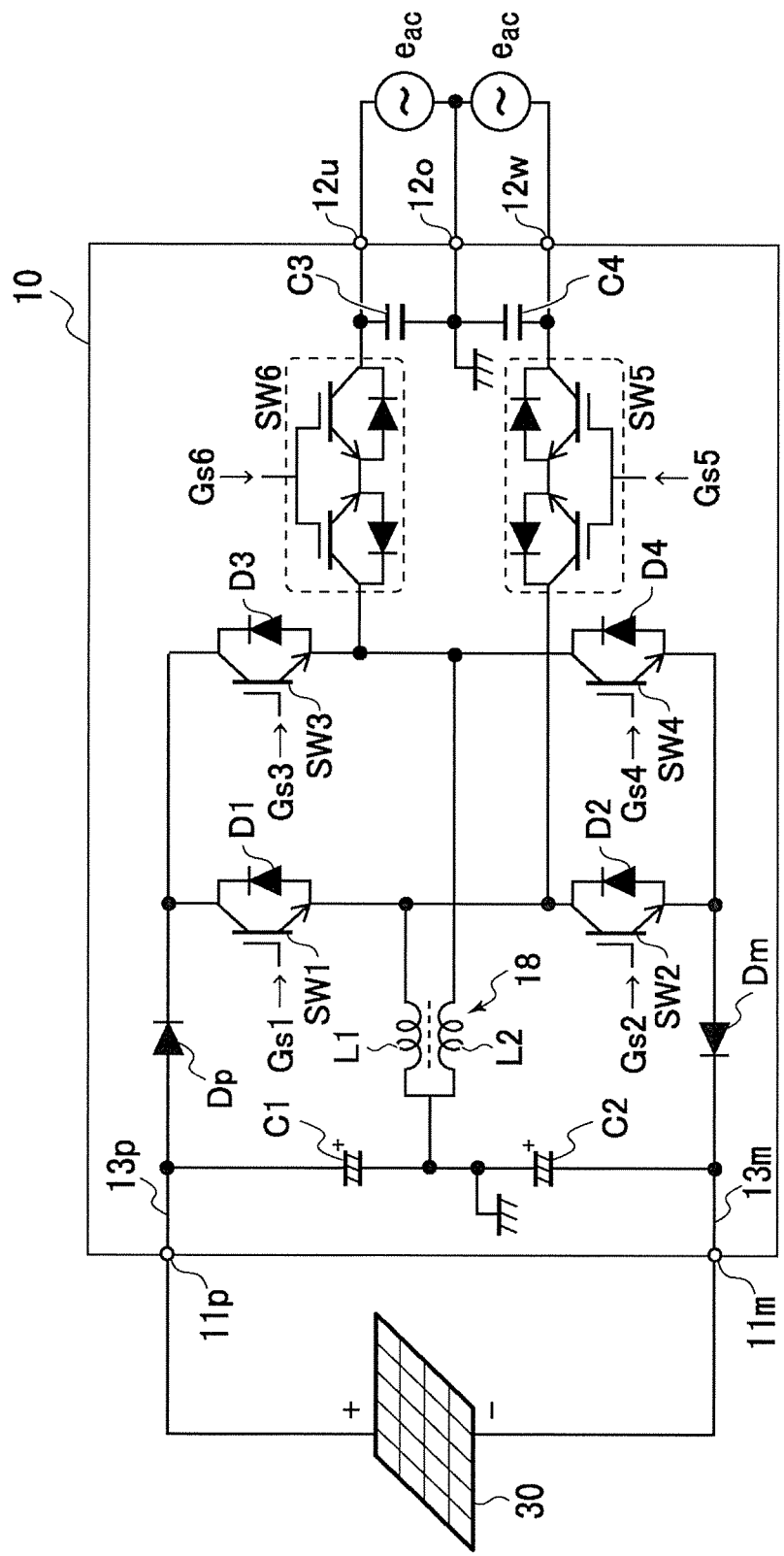
FIG. 3 is an explanatory diagram of a more detailed circuit configuration example of the step up/down inverter circuit according to the embodiment.

As shown in FIG. 2, the step up/down inverter circuit 10 according to the embodiment is a circuit which is used while being connected to a control unit 20 and a DC power supply such as a solar cell array 30. As shown in the drawings, the step up/down inverter circuit 10 includes a plus-side input terminal 11$p$ and a minus-side input terminal 11$m$ which are respectively connected to a plus-side output terminal and a minus-side output terminal of the solar cell array 30 (or other DC power supplies). Further, the step up/down inverter circuit 10 includes a u-terminal 12u, an o-terminal 12o, and a w-terminal 12w which are single-phase three-wire type output terminals.

A plus line 13p and a minus line 13m are respectively connected to the plus-side input terminal 11p and the minus-side input terminal 11m. A voltage dividing circuit 14 in which electrolytic capacitors C1 and C2 are connected in series to each other so that the plus-side terminal is on the side of the plus line 13p is disposed between the plus line 13p and the minus line 13m. The electrolytic capacitor C1 and the electrolytic capacitor C2 of the voltage dividing circuit 14 are capacitors having the same specification (the same capacity). Thus, a potential of a wiring (hereinafter, referred to as an intermediate potential portion) between the electrolytic capacitors C1 and C2 of the voltage dividing circuit 14 becomes an intermediate value (an intermediate potential) between a potential of the plus-side input terminal 11p (the plus line 13p) and a potential of the minus-side input terminal 11m (the minus line 13m). Then, the voltage dividing circuit 14 is formed as a circuit in which the intermediate potential portion is grounded as shown in the drawing.

A first leg 15 which connects a first switching element SW1 and a second switching element SW2 in series to each other and a second leg 16 which connects a third switching element SW3 and a second switching element SW4 in series to each other are disposed between the plus line 13p and the minus line 13m.

As the first to fourth switching elements SW1 to SW4, an IGBT (Insulated Gate Bipolar Transistor) can be used as shown in FIG. 3. Further, in FIG. 3, a diode Dn connected in parallel to the n-th switching element SWn (n=1 to 4) is a freewheel diode.

Here, the first to fourth switching elements SW1 to SW4 may be elements (GTO (Gate Turn-Off) thyristors or the like) other than IGBTs or may be bidirectional switching elements.

Further, as shown in FIG. 3, it is desirable to provide a reverse flow prevention diode Dp at the plus line 13p and it is desirable to provide a reverse flow prevention diode Dm at the minus line 13m.

As shown in FIG. 2, a first reactor L1 is disposed between a wiring (hereinafter, referred to as a first intra-leg wiring) connecting two switching elements SW1 and SW2 of the first leg 15 and the intermediate potential portion of the voltage dividing circuit 14. Further, a second reactor L2 is disposed between a wiring (hereinafter, referred to as a second intra-leg wiring) connecting two switching elements SW3 and SW4 of the second leg 16 and the intermediate potential portion of the voltage dividing circuit 14. In addition, the step up/down inverter circuit 10 according to the embodiment has a configuration in which a magnetic coupling reactor 18 provided with two coils serving as the first reactor L1 and the second reactor L2 is mounted on a common magnetic core 18a as the first reactor L1 and the second reactor L2.

A first bidirectional switching element SW5 is disposed between the first intra-leg wiring and the w-terminal 12w. A second bidirectional switching element SW6 is disposed between the second intra-leg wiring and the u-terminal 12u. The first bidirectional switching element SW5 and the second bidirectional switching element SW6 may be elements capable of performing a bidirectional current ON/OFF control. Thus, for example, as shown in FIG. 3, elements obtained by the combination of two IGBTs and two diodes can be used as the bidirectional switching elements SW5 and SW6.

As shown in FIG. 2, a smoothing circuit 17 connecting the capacitor C3 to the capacitor C4 having the same specification (the same capacity) in series to each other is disposed between a wiring connecting the w-terminal 12w and the first bidirectional switching element SW5 and a wiring connecting the u-terminal 12u and the second bidirectional switching element SW6. A wiring connecting the capacitor C3 and the capacitor C4 of the smoothing circuit 17 is grounded and is connected to the o-terminal as shown in the drawing.

The control unit 20 connected to the step up/down inverter circuit 10 is a unit which performs an ON/OFF control of the switching elements SW1 to SW6 inside the step up/down inverter circuit 10 by supplying control signals Gs1 to Gs6 thereto.

Figure 4:
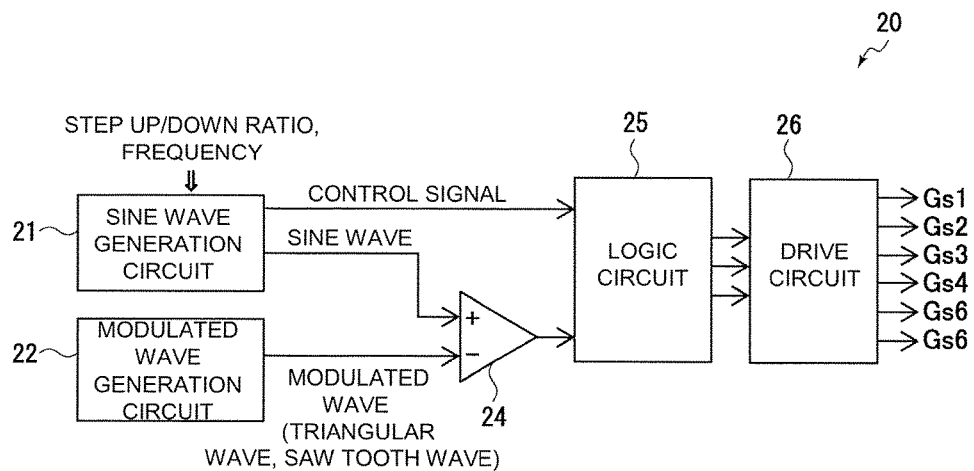
FIG. 4 is a schematic configuration diagram of a control unit for the step up/down inverter circuit according to the embodiment.
Figure 5:
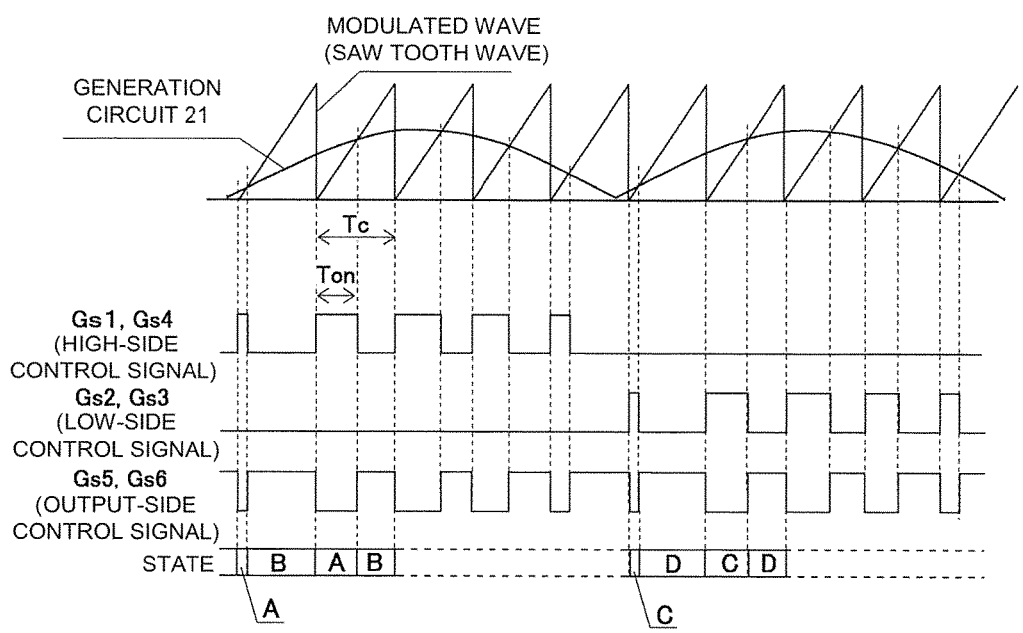
FIG. 5 is an explanatory diagram of a function of the control unit.

Hereinafter, a function of the step up/down inverter circuit 10 according to the embodiment will be described along with the control contents using the control unit 20 with reference to FIGS. 4 to 10. In addition, in these drawings, FIG. 4 is a schematic configuration diagram of the control unit 20. FIG. 5 is a diagram illustrating a function of the control unit 20 and FIGS. 6 to 9 are diagrams illustrating a current flow method in various states of the step up/down inverter circuit 10.

As shown in FIG. 4, the control unit 20 is a unit which includes a sine wave generation circuit 21, a modulated wave generation circuit 22, a comparator 24, a logic circuit 25, and a drive circuit 26.

The modulated wave generation circuit 22 is a circuit which outputs a modulated wave (for example, a saw tooth wave or triangular wave of about 19 kHz) with a comparatively high frequency.

The sine wave generation circuit 21 is a circuit which repeatedly outputs a sine wave (in the embodiment, a half period of a voltage≥0) for a half period. Additionally, the sine wave generation circuit 21 is generally realized as a circuit including a processor (a microcontroller or the like).

An AC frequency (50 Hz, 60 Hz) to be output and a step up/down ratio which is a ratio of the input voltage with respect to the effective value of the AC current to be output are input to the sine wave generation circuit 21. Then, the sine wave generation circuit 21 repeatedly outputs a sine wave for a half period having a maximum value corresponding to the input step up/down ratio having the same frequency as the input frequency. Further, the sine wave generation circuit 21 changes the level of the control signal to the logic circuit 25 at the time of completing the output of the sine wave for a half period to notify the state to the logic circuit 25.

The comparator 24 is a circuit (a comparator) which outputs a high-level digital signal when the voltage of the sine wave from the sine wave generation circuit 21 is higher than the voltage of the modulated wave from the modulated wave generation circuit 22.

The logic circuit 25 is a circuit which outputs a high-side control signal, a low-side control signal, and an output-side control signal based on the signal from the comparator 24 and the control signal from the sine wave generation circuit 21. Here, the high-side control signal is a signal which is converted into a control signal Gs1 and a control signal Gs4 changing with time in the same pattern as the high-side control signal by the drive circuit 26. The low-side control signal is a signal which is converted into a control signal Gs2 and a control signal Gs3 changing with time in the same pattern as the low-side control signal by the drive circuit 26 and the output-side control signal is a signal which is converted into a control signal Gs5 and a control signal Gs6 changing with time in the same pattern as the output-side control signal by the drive circuit 26.

Hereinafter, functions of the logic circuit 25 and the sine wave generation circuit 21 will be described in more detail with reference to FIG. 5. In addition, FIG. 5 shows a modulated wave (a saw tooth wave) having a long period Tc, but the period Tc of the actual modulated wave is set to be extremely shorter than the cycle of the sine wave output from the sine wave generation circuit 21 as described above.

As described above, a digital signal which becomes a high level when the voltage of the sine wave from the sine wave generation circuit 21 is higher than the voltage of the modulated wave from the modulated wave generation circuit 22 is output from the comparator 24.

The logic circuit 25 is a circuit which directly outputs the digital signal as the output-side control signal. Further, a circuit which outputs the high-side control signal and the low-side control signal changing with time as shown in FIG. 5 based on the digital signal from the comparator 24 is obtained. That is, the logic circuit 25 outputs the high-side control signal that alternates between a state corresponding to a zero level and a state having the same level as the digital signal from the comparator 24 and the transition between the two states is performed whenever the output of the sine wave for a half period is completed. Further, the logic circuit 25 outputs the low-side control signal having the same level as the digital signal from the comparator 24 when the high-side control signal becomes a zero level and becoming a zero level when the high-side control signal has the same level as the digital signal from the comparator 24.

Then, the drive circuit 26 (see FIG. 4) supplies the control signal Gs1 and Gs4 changing in the same pattern as the high-side control signal to the switching elements SW1 and SW4 and supplies the control signal Gs2 and Gs3 changing in the same pattern as the low-side control signal to the switching elements SW2 and SW3. Further, the drive circuit 26 supplies the control signals Gs5 and Gs6 changing in the same pattern as the output-side control signal to the switching elements SW5 and SW6.

Thus, during a period in which the low-side control signal becomes the zero level, the step up/down inverter circuit 10 alternately takes a state A where the first switching element SW1 and the fourth switching element SW4 are turned on and the other switching elements are turned off and a state B where the first bidirectional switching element SW5 and the second bidirectional switching element SW6 are turned on and the other switching elements are turned off.

Further, during a period in which the high-side control signal becomes the zero level, the step up/down inverter circuit 10 alternately takes a state C where the second switching element SW2 and the third switching element SW3 are turned on and the other switching elements are turned off and a state D where the first bidirectional switching element SW5 and the second bidirectional switching element SW6 are turned on and the other switching elements are turned off.

Figure 6:
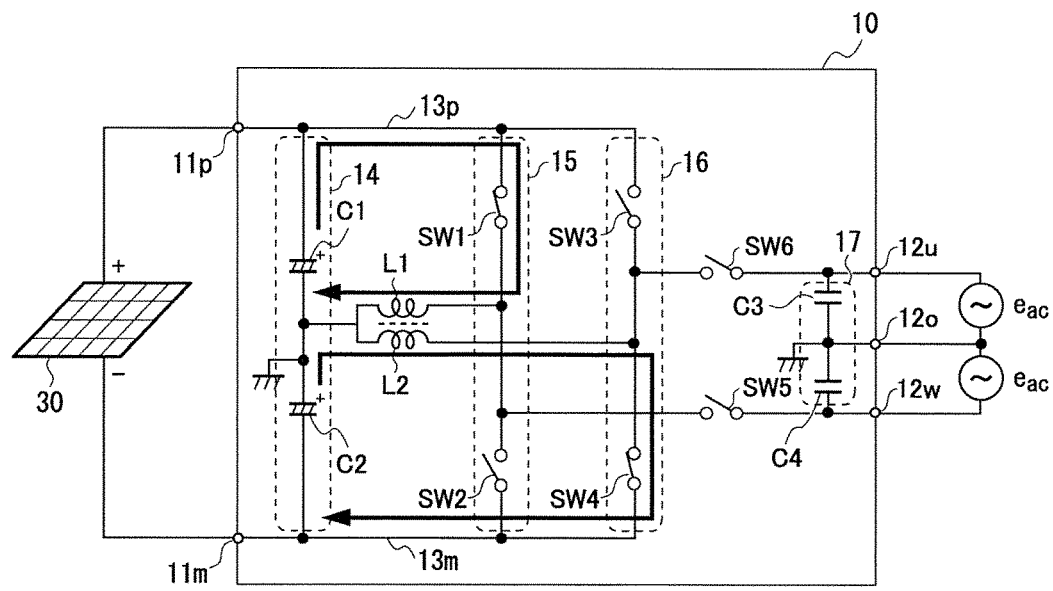
FIG. 6 is a diagram illustrating a current flow method in a state A of the step up/down inverter circuit according to the embodiment.
Figure 7:
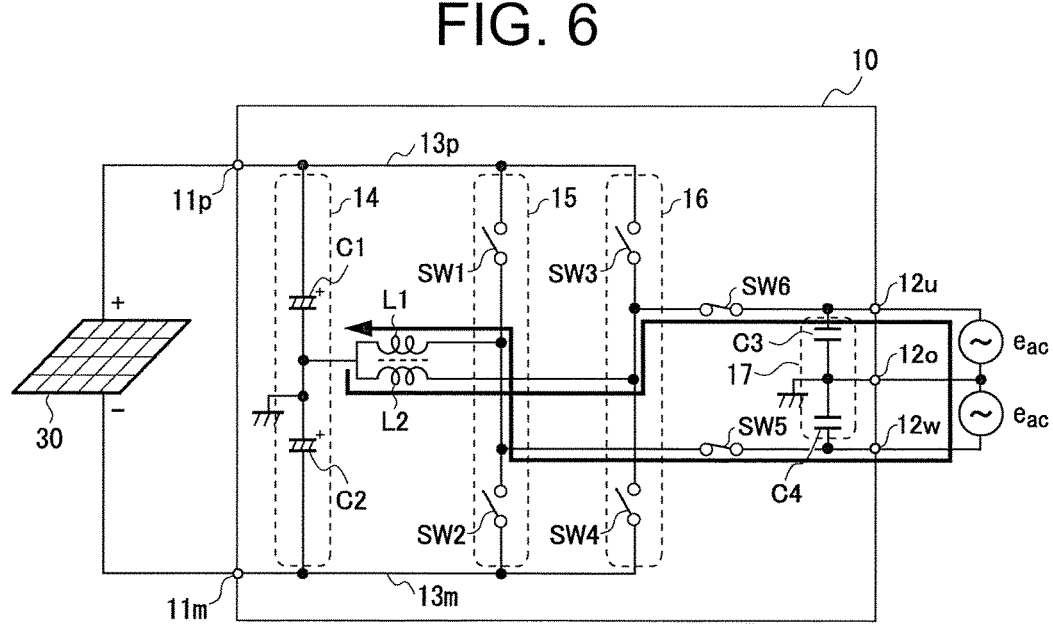
FIG. 7 is a diagram illustrating a current flow method in a state B of the step up/down inverter circuit according to the embodiment.
Figure 8:
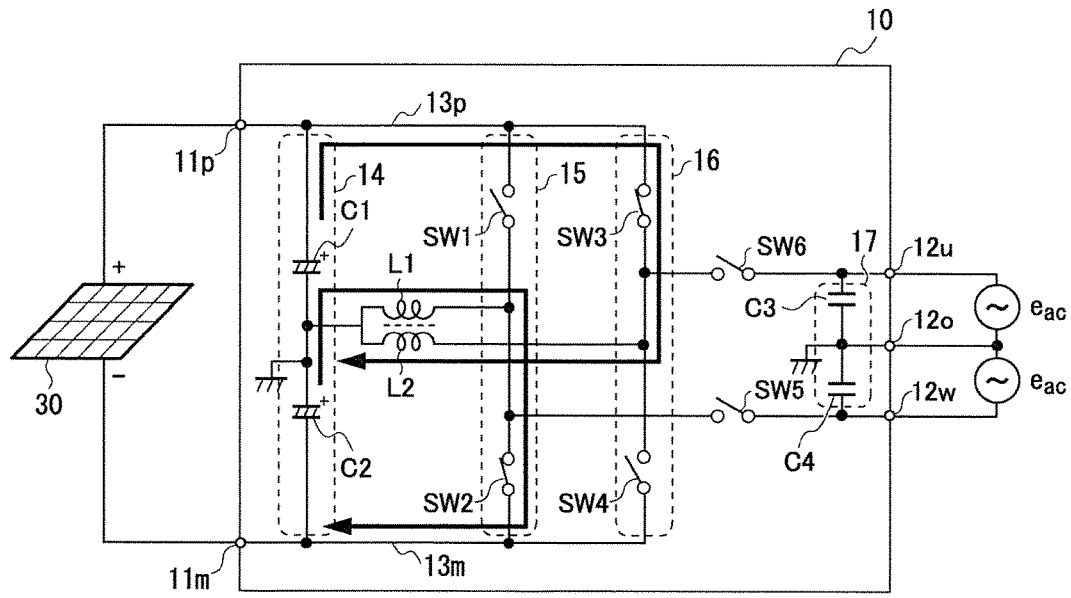
FIG. 8 is a diagram illustrating a current flow method in a state C of the step up/down inverter circuit according to the embodiment.
Figure 9:
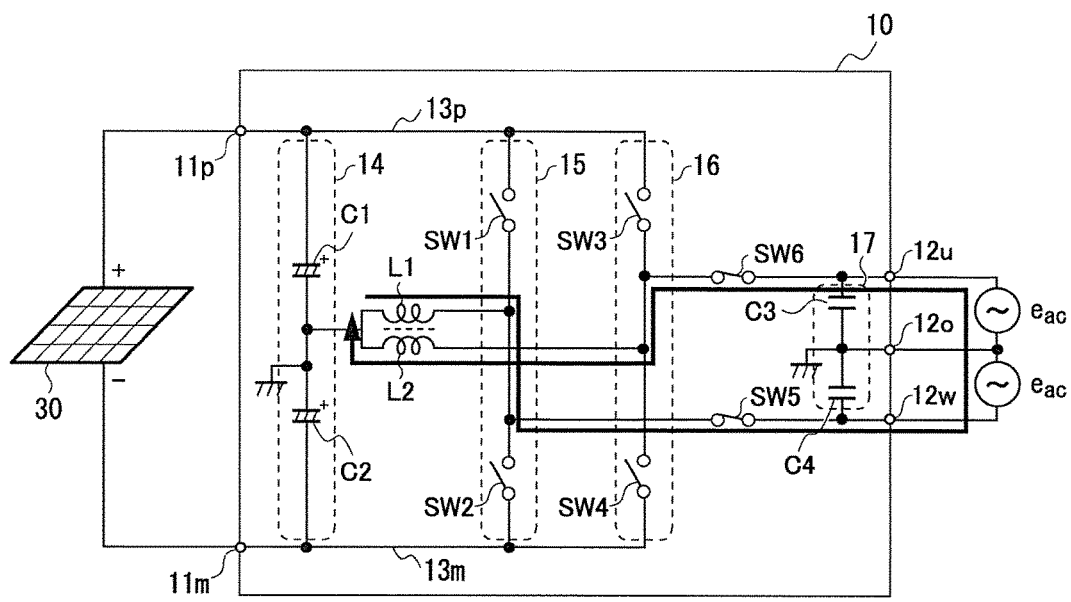
FIG. 9 is a diagram illustrating a current flow method in a state D of the step up/down inverter circuit according to the embodiment.

In the state A, a current flows inside the step up/down inverter circuit 10 as indicated by the arrow in FIG. 6 so that energy can be stored in the first reactor L1 and the second reactor L2. Then, when the state A is changed to the state B, the energy stored in the first reactor L1 and the second reactor L2 is released and a current flows as indicated by the arrow in FIG. 7. Meanwhile, in the state C, a current flows as indicated by the arrow in FIG. 8 and the energy can be stored in the first reactor L1 and the second reactor L2. Then, when the state C is changed to the state D, the energy stored in the first reactor L1 and the second reactor L2 is released and a current flows as indicated by the arrow in FIG. 9.

Here, a ratio (that is, a duty ratio) DON with respect to the period Tc of the modulated wave for a time (Ton of FIG. 5) in which the switching elements SW1 and SW4 or the switching elements SW2 and SW3 are turned on, an input voltage V1, and an output voltage (a voltage between the u-terminal 12u and the w-terminal 12w) V2 sin θ satisfy the following equation (1).

[Math. 1]

$$V_2 \sin\theta = \frac{D_{ON}}{1 - D_{ON}} V_1 \qquad (1)$$

Thus, in order to output a sine wave which is not distorted, Ton is set to a relatively small value and DON is set to a value obtained by the following equation (2).

[Math. 2]

$$D_{ON} = \frac{V_2 \sin\theta}{V_1 + V_2 \sin\theta} \qquad (2)$$

Then, the control signals outputs from the control unit 20 have values in which DON satisfies the above-described equation. Thus, according to the step up/down inverter circuit 10 of the embodiment, it is possible to output a sine wave of which a waveform is not distorted at an arbitrary step up/down ratio within the step up/down ratio range (the range of the value of V1/V2) determined from the specifications of the elements.

As described above, the step up/down inverter circuit 10 according to the embodiment can convert DC power into AC power by a step up/down operation only by the ON/OFF control of each switching element without switching the control at the time of step-down and step-up. Thus, according to the step up/down inverter circuit 10, it is possible to convert DC power into AC power without causing a problem in which an AC waveform around a specific input voltage is distorted. Further, the step up/down inverter circuit 1 does not include a step up/down circuit (performing a step up/down operation by an inverter). Thus, the step up/down inverter circuit 10 can be manufactured with a small size and a small weight at a low cost compared to a conventional inverter circuit to a degree in which the step up/down inverter circuit is not provided.

Modified Example

Figure 10:
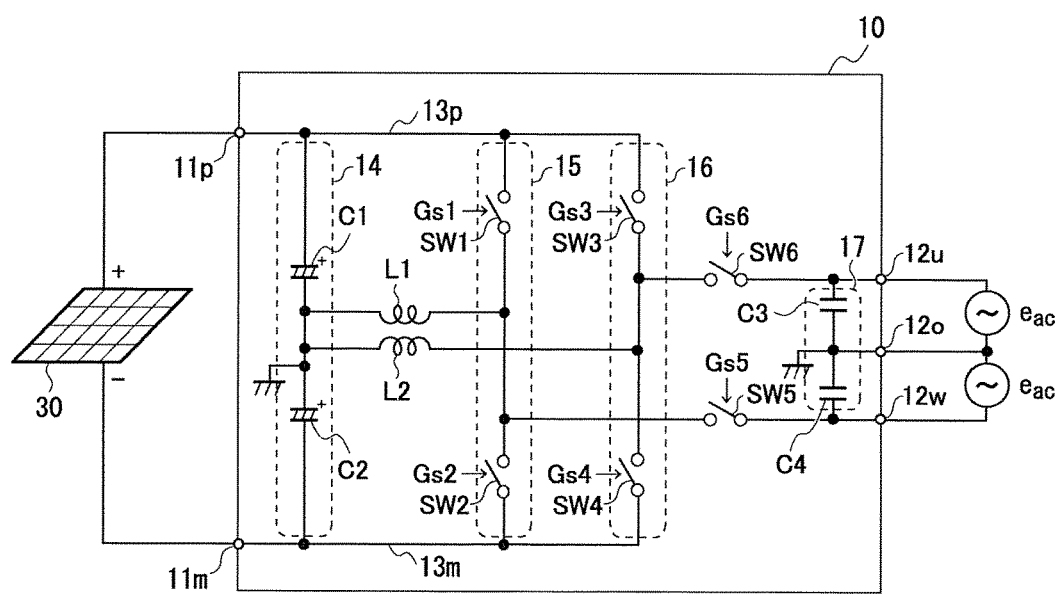
FIG. 10 is an explanatory diagram of a modified example of the step up/down inverter circuit according to the embodiment.

The step up/down inverter circuit 10 can be modified into various forms. For example, the step up/down inverter circuit 10 can be modified into a circuit including the first reactor L1 and the second reactor L2 which are independent (separate) from each other as shown in FIG. 10. Here, when the first reactor L1 and the second reactor L2 are disposed so that a magnetic field generated by the first reactor L1 and the second reactor L2 is strengthened, each reactor can be made to function as a reactor having higher inductance. Thus, it is desirable that the step up/down inverter circuit 10 be realized as a circuit in which the first reactor L1 and the second reactor L2 are disposed so that a magnetic field generated by them is strengthened when a current toward the intermediate potential portion of the voltage dividing circuit 14 flows to one of the first reactor L1 and the second reactor L2 and a current from the intermediate potential side of the voltage dividing circuit 14 flows to the other thereof.

The step up/down inverter circuit 10 may be changed to a circuit having a single-phase two-wire output terminal. In addition, when the step up/down inverter circuit 10 is modified into such a circuit, the smoothing circuit can be one capacitor. Further, when the first reactor L1 and the second reactor L2 are connected in series to each other even when the voltage dividing circuit 14 is not provided, energy can be stored in the first reactor L1 and the second reactor L2 by a path including the first switching element SW1, the first reactor L1, the second reactor L2, and the fourth switching element SW4 and a path including the third switching element SW3, the second reactor L2, the first reactor L1, and the second switching element SW2. Thus, the voltage dividing circuit 14 may be eliminated from the step up/down inverter circuit 10.

The control unit 20 may be modified into other units having a different configuration as described above, for example, a unit (for example, a micro controller) which periodically calculates Don by equation (2) and generates and outputs a control signal based on the calculation result.

The invention claimed is:

1. A step up/down inverter circuit that converts DC power of a first voltage from a DC power supply into AC power of a second voltage, the step up/down inverter circuit comprising:
   a plus line connected to a plus output terminal of the DC power supply, and a minus line connected to a minus output terminal of the DC power supply;
   a first leg disposed between the plus line and the minus line and having two switching elements connected in series;
   a second leg disposed between the plus line and the minus line and having two switching elements connected in series;
   a first reactor having one end connected to a first intra-leg wiring connecting the two switching elements of the first leg;
   a second reactor having one end connected to a second intra-leg wiring connecting the two switching elements of the second leg and having an other end connected to an other end of the first reactor;
   a first bidirectional switching element having one end connected to the first intra-leg wiring and having an other end connected to a first output terminal by a first output line;
   a second bidirectional switching element having one end connected to the second intra-leg wiring and having an other end connected to a second output terminal by a second output line;
   a smoothing circuit disposed between the first output line and the second output line and configured to smooth a voltage between the other end of the first bidirectional switching element and the other end of the second bidirectional switching element; and
   a voltage dividing circuit disposed between the plus line and the minus line and having an intermediate potential portion having a potential corresponding to an intermediate potential between a potential of the plus line and a potential of the minus line and connected to a connection end between the first and second reactors.

2. The step up/down inverter circuit according to claim 1, wherein the voltage dividing circuit is a circuit in which two capacitors having the same capacity are connected in series and a wiring connecting the two capacitors serves as the intermediate potential portion.

3. The step up/down inverter circuit according to claim 2, wherein the smoothing circuit is a circuit in which two capacitors having the same capacity are connected in series and a wiring connecting the two capacitors is connected to a neutral point.

4. The step up/down inverter circuit according to claim 3, wherein the first reactor and the second reactor are configured so that when a current flows toward a connection end side between the first reactor and the second reactor in one of the first reactor and the second reactor and a current from the connection end side flows to the other of the first reactor and the second reactor, a magnetic field generated by each other is strengthened.

5. The step up/down inverter circuit according to claim 2, wherein the first reactor and the second reactor are configured so that when a current flows toward a connection end side between the first reactor and the second reactor in one of the first reactor and the second reactor and a current from the connection end side flows to the other of the first reactor and the second reactor, a magnetic field generated by each other is strengthened.

6. The step up/down inverter circuit according to claim 1, wherein the smoothing circuit is a circuit in which two capacitors having the same capacity are connected in series and a wiring connecting the two capacitors is connected to a neutral point.

7. The step up/down inverter circuit according to claim 6, wherein the first reactor and the second reactor are configured so that when a current flows toward a connection end side between the first reactor and the second reactor in one of the first reactor and the second reactor and a current from the connection end side flows to the other of the first reactor and the second reactor, a magnetic field generated by each other is strengthened.

8. A method for controlling the step up/down inverter circuit according to claim 1, comprising:
   outputting an AC voltage for a half period in which a potential of the second output terminal is higher than a potential of the first output terminal from the first output terminal and the second output terminal by repeatedly performing a first control process while changing a duration of a first state in response to an AC frequency to be output and a step up/down ratio corresponding to a ratio of the first voltage with respect to the second voltage, the first control process being performed such that the first state is formed in which a first switching element corresponding to a switching element near the plus line inside the first leg and a fourth switching element corresponding to a switching element near the minus line inside the second leg are turned on and a second switching element corresponding to a switching element near the minus line inside the first leg, a third switching element corresponding to a switching element near the plus line inside the second leg, the first bidirectional switching element, and the second bidirectional switching element are turned off and then a second state is formed in which the first switching element, the second switching element, the third switching element, and the fourth switching element are turned off and the first bidirectional switching element and the second bidirectional switching element are turned on; and
   outputting an AC voltage for a half period in which the potential of the second output terminal is lower than the potential of the first output terminal from the first output terminal and the second output terminal by repeatedly performing a second control process while changing a duration of a third state in response to the AC frequency to be output and the step up/down ratio, the second control process being performed such that the third state is formed in which the second switching element and the third switching element are turned on and the first switching element, the fourth switching element, the first bidirectional switching element, and the second bidirectional switching element are turned off and then a fourth state is formed in which the first switching element, the second switching element, the third switching element, and the fourth switching element are turned off and the first bidirectional switching element and the second bidirectional switching element are turned on.

9. The step up/down inverter circuit according to claim 1, wherein the first reactor and the second reactor are configured so that when a current flows toward a connection end side between the first reactor and the second reactor in one of the first reactor and the second reactor and a current from the connection end side flows to the other of the first reactor and the second reactor, a magnetic field generated by each other is strengthened.

10. The step up/down inverter circuit according to claim 1, wherein the first reactor and the second reactor are configured so that when a current flows toward a connection end side between the first reactor and the second reactor in one of the first reactor and the second reactor and a current from the connection end side flows to the other of the first reactor and the second reactor, a magnetic field generated by each other is strengthened.

11. A method for controlling the step up/down inverter circuit according to claim 1, comprising:
outputting an AC voltage for a half period in which a potential of the second output terminal is higher than a potential of the first output terminal from the first output terminal and the second output terminal by repeatedly performing a first control process while changing a duration of a first state in response to an AC frequency to be output and a step up/down ratio corresponding to a ratio of the first voltage with respect to the second voltage, the first control process being performed such that the first state is formed in which a first switching element corresponding to a switching element near the plus line inside the first leg and a fourth switching element corresponding to a switching element near the minus line inside the second leg are turned on and a second switching element corresponding to a switching element near the minus line inside the first leg, a third switching element corresponding to a switching element near the plus line inside the second leg, the first bidirectional switching element, and the second bidirectional switching element are turned off and then a second state is formed in which the first switching element, the second switching element, the third switching element, and the fourth switching element are turned off and the first bidirectional switching element and the second bidirectional switching element are turned on; and outputting an AC voltage for a half period in which the potential of the second output terminal is lower than the potential of the first output terminal from the first output terminal and the second output terminal by repeatedly performing a second control process while changing a duration of a third state in response to the AC frequency to be output and the step up/down ratio, the second control process being performed such that the third state is formed in which the second switching element and the third switching element are turned on and the first switching element, the fourth switching element, the first bidirectional switching element, and the second bidirectional switching element are turned off and then a fourth state is formed in which the first switching element, the second switching element, the third switching element, and the fourth switching element are turned off and the first bidirectional switching element and the second bidirectional switching element are turned on.

* * * * *